(No Model.) 2 Sheets—Sheet 1.
T. B. JEFFERY.
PROCESS OF SECURING RUBBER TIRES IN WHEEL RIMS.
No. 370,396. Patented Sept. 27, 1887.
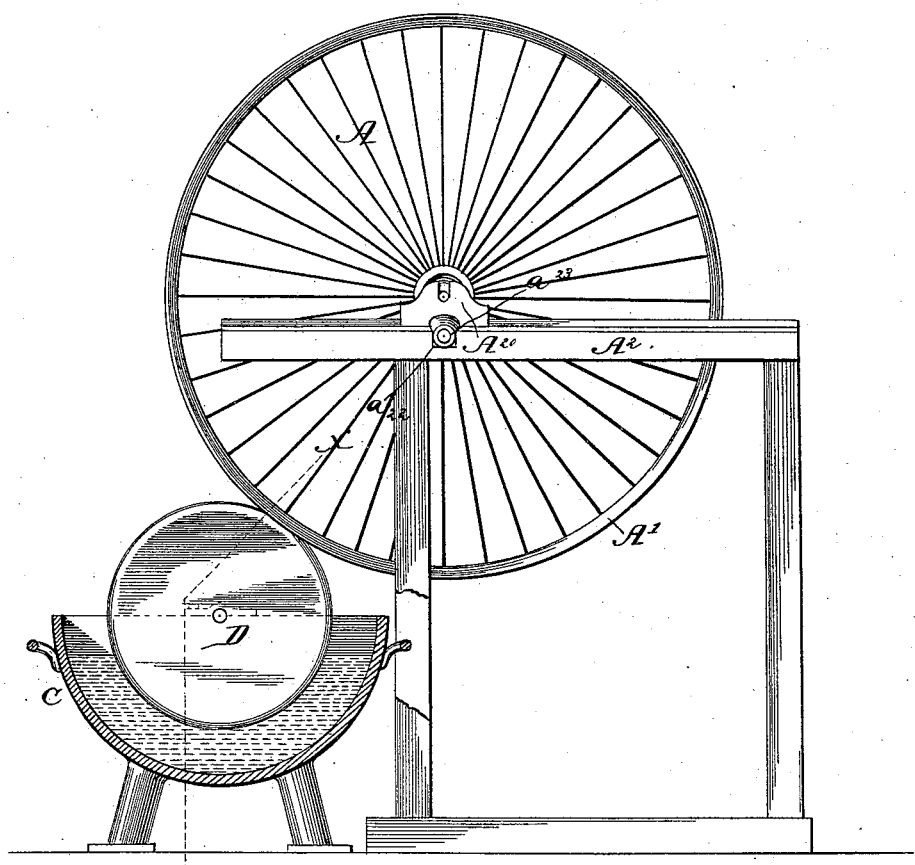
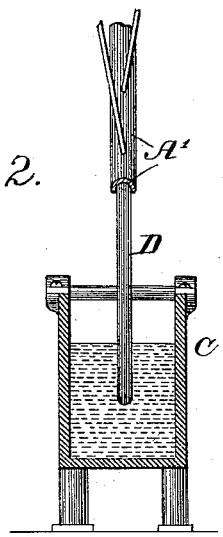
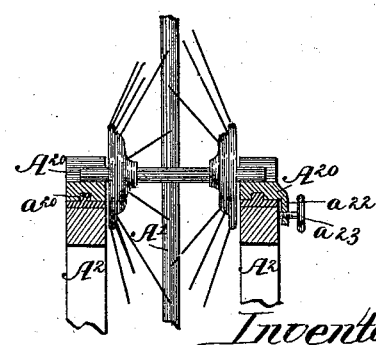
Witnesses:
Inventor
Thos. B. Jeffery
By Chas. S. Burton
Attorney (No Model.) 2 Sheets—Sheet 2.
T. B. JEFFERY.
PROCESS OF SECURING RUBBER TIRES IN WHEEL RIMS.
No. 370,396. Patented Sept. 27, 1887.
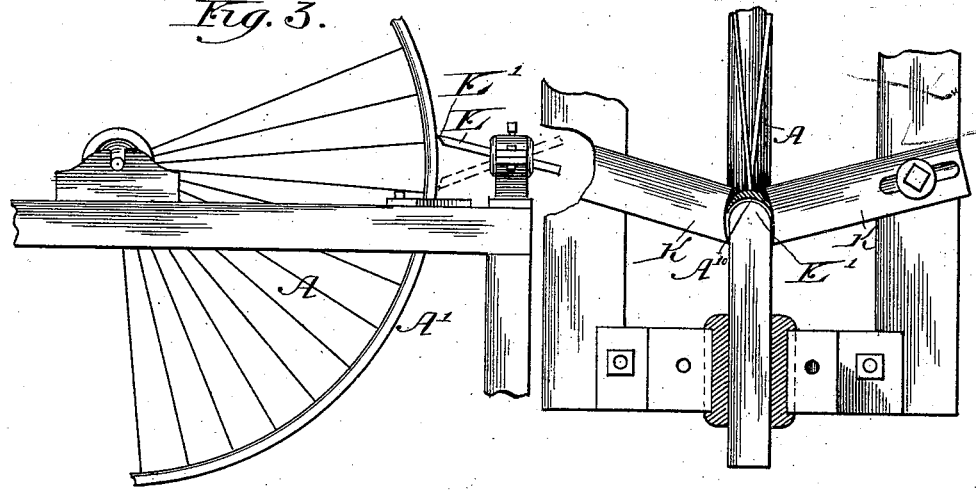
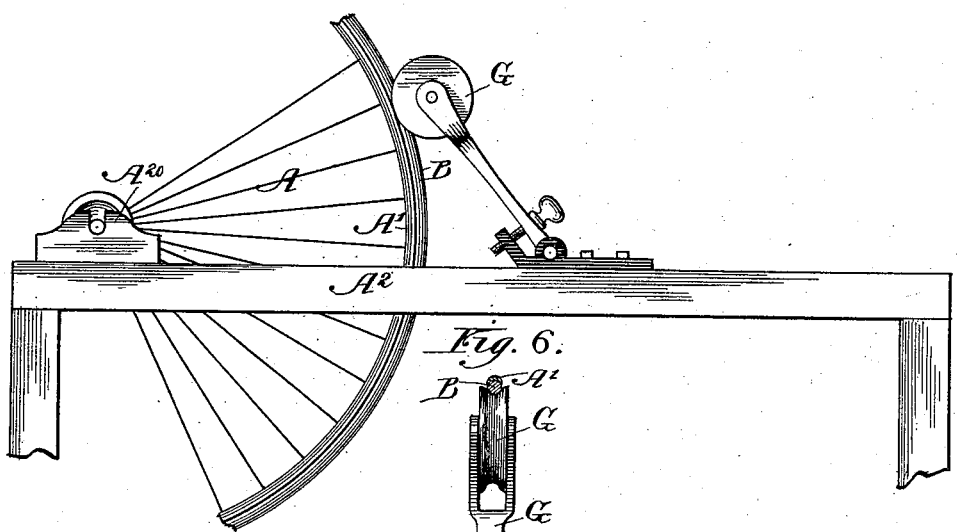
Witnesses:
Inventor:
Thos. B. Jeffery
By Chas. S. Burton
Attorney.

UNITED STATES PATENT OFFICE.

THOMAS B. JEFFERY, OF CHICAGO, ILLINOIS.

PROCESS OF SECURING RUBBER TIRES IN WHEEL-RIMS.

SPECIFICATION forming part of Letters Patent No. 370,396, dated September 27, 1887.

Application filed October 4, 1886. Serial No. 215,226. (No model.)

*To all whom it may concern:*

Be it known that I, THOMAS B. JEFFERY, a citizen of the United States, residing at Chicago, in the county of Cook and State of Illinois, have invented certain new and useful Improvements in the Process of Securing Rubber Tires in Wheel-Rims, which are fully described and set forth in the following specification, reference being had to the accompanying drawings, forming a part hereof.

This invention has for its purpose to place the rubber tire of the wheel of a velocipede or similar vehicle in the exteriorly-concave rim, which is arranged to receive it, and to secure it throughout by cement, which shall be uniformly distributed over the concave surface with which the junction is to be effected, and which shall not be caused to flow or be spread on the outer surface of either the tire or the wheel, and to effect the junction in such manner that the tire shall be uniformly stretched and therefore made uniformly thick throughout the entire circumference of the wheel. This process comprises six successive steps or sub-processes: first, applying the cement to the concave surface of the rim; second, uniformly distributing the cement while plastic; third, dressing down the cement to a uniform concave surface in the cavity of the rim after it is hardened therein, in order to cause the rubber tire to come into contact therewith over the entire concave surface throughout the entire circumference; fourth, putting the tire onto the wheel and into the concave rim; fifth, baking or heating the wheel rim or tire to a temperature which will cause the cement to adhere most perfectly; sixth, forcing the tire closely and uniformly into the rim and embedding it thereby into the cement.

My invention has more particularly to do with the first, second, and last of these sub-processes, but involves the use of them all in proper succession, as together they constitute an entire process.

In applying said invention I employ the mechanism illustrated in the accompanying drawings.

Figure 1 is a sectional side elevation of my device for applying the cement to the rim, being identical in form with and therefore fully representing my device for the second sub-process—viz., equally distributing the cement while plastic. Fig. 2 is a section through X X on Fig. 1. Fig. 3 is a sectional side elevation of my device for pressing or molding the cement in the rim to a uniform concave surface. Fig. 4 is a section through Y Y on Fig. 3. Fig. 5 is a sectional side elevation of my device for forcing the tire closely in the rim. Fig. 6 is a detail plan of the device shown in Fig. 5, showing the wheel rim and tire in section, as at the line V V on Fig. 5. Fig. 7 is a vertical section through W W, Fig. 1.

A is the wheel. B is the tire.

C is a trough of cement, and represents, also, a trough of water precisely similar and similarly located in the second sub-process.

D is a wheel suitably journaled over the trough C, which revolves with the lower edge dipping in the cement or water, as the case may be, in the trough, its upper edge meanwhile bearing against the rim A' of the wheel A. The edge of the wheel D is shaped to fit the concave surface of the wheel-rim A', so that, as far as possible, it may apply the cement to the rim upon the concave surface only.

The bearings $A^{20}$ of the wheel A are made adjustable on the frame $A^2$ in any convenient manner, as by being provided with the groove $a^{20}$, which fits a tongue, $a^{21}$, upon the upper surface of the upper rail of the frame $A^2$, and having the lateral lug $a^{22}$, provided with the clamp-screw $a^{23}$, which may be screwed through the lug and against said upper rail, and thereby secure the bearings in any desired position thereon. The wheel, being suitably hung in these adjustable bearings, is advanced into contact with the wheel D. This adjustment of the bearings also adapts the device to be used in applying the cement to wheels of different diameters. When the rim of the wheel A is in contact with the periphery of the wheel D, the former is revolved, and, by its contact with said wheel D, the latter is also revolved, and carries up the cement from the trough and applies it to the concave rim of the wheel A. When a sufficient quantity of cement has been thus applied, and while the same is still plastic, water is substituted for cement in the trough; or, if preferred, another trough containing water and having a wheel journaled thereon in all respects like the trough and wheel used in supplying the cement may be substituted. The wheel A is then revolved, as before, in contact with the wheel D, the latter running in the water, instead of cement. The water prevents wheel D from adhering to the cement in the rim of wheel A, and the continued revolution of the two wheels in contact causes the wheel D gradually to mold and distribute the plastic cement to a uniform thickness over the concave surface throughout the entire circumference of the wheel. This process having been satisfactorily completed, the cement is allowed to harden and the trough C and wheel D are removed, and the dresser E, having the end $e$ shaped convex in order to fit the desired form of the concave groove in the rim A', is suitably secured in the frame, as E', which is supported on the frame $A^2$, and the said dresser E is advanced toward and into the groove $A^{10}$, and the wheel A, being rapidly revolved while the dresser is advanced into the groove, causes said dresser to cut off the portions of cement which protrude beyond the surface which it is designed to form to receive the tire. While this peripheral-dressing process is being performed there may be performed, also, another process, for which the lateral scrapers are provided. These are fixed at any convenient point in the frame and are set into contact with the rim A', and serve to remove any portions of cement which may have been applied to the rim outside the groove $A^{10}$, or which may be forced over the flange of the groove during the dressing and distributing process. This dressing being completed, the tire F is placed upon the wheel, being stretched over the flanges of the rim and so gotten into the groove $A^{10}$. In this process the tire is quite certain to be unequally stretched, and so reduced in diameter and thickness in some points as compared with others. This must first be corrected and the tire further pressed into the concave groove, and caused thereby to come fully into contact with the cement and receive the full support of the metal back of the rim, and the cement must also be again rendered adhesive by heating, in order that it may effect the junction intended between the rim and the tire. This last-named step in the process is next performed by any method which will heat the rim and cement sufficiently to render the cement plastic and adhesive—as, for instance, by placing the tire thereon in a heated chamber or oven until it attains the proper temperature—and when this is done the wheel is again mounted upon the bearings $A^{20}$ in the frame $A^2$, and the dresser E and its supports having been removed, there is substituted the wheel G, which is journaled in the frame G', which is hinged to the bracket $G^3$, which is secured to the frame $A^2$, and is provided with the adjusting-screw $G^2$, which tends to rock the frame G' and adjust the wheel G toward the wheel A.

The periphery of the wheel G is concave to fit the tire F, and the pressure of the wheel G is regulated by the screw $G^2$. The wheel A being placed in position in the bearings $A^{20}$, the wheel G is pressed against it, the concave periphery of the latter bearing against the outer convex surface of the tire F. The wheel A being revolved, communicates like motion to the wheel G, and said wheel being set with reference to the wheel A, so that there is only sufficient space between them for the tire, presses said tire closely into the groove $A^{10}$, and as it rolls over any part of the tire which has been less stretched than the remainder, and is consequently thicker, it will compress such portion and proportionately elongate it and produce a slack, which will be taken up at any succeeding portion which is thinner. This process is continued until the tire is evenly stretched and has uniform thickness, the temperature being meanwhile maintained high enough to prevent the cement setting—that is, hardening too much to be molded by the pressure of the tire into it. Such uniform temperature may be maintained by running the rim of the wheel in the trough of hot water while the evening process is being performed. Ordinarily, however, the metal of the rim will hold the heat long enough to retain the cement plastic and adhesive throughout the entire process of evening.

I am aware that it has been common to apply glue and other like substances on surfaces on which it was desirable to have them adhere by means of a wheel or roller running in the liquid to be applied and in contact with the surface to which it is to be applied, and I do not claim, broadly, the use of such a wheel for such purpose; but, so far as I am aware, this process has only been employed to apply liquid material to a plane cylindrical surface. In my above-described process I apply it to a concave surface which could not be made to reach the liquid directly without dipping into it and causing it to cover the outer convex as well as the inner concave surface.

I claim—

1. The hereinabove-described process of fastening rubber tires upon wheels, which consists in, first, rotating the wheel with its rim in contact with the rim of a secondary wheel which runs in the cement; next, rotating the wheel with its cement-covered rim in contact with cement-dressing devices shaped conformably to the tire which is to be cemented onto the rim; thirdly, stretching the tire over the rim; fourthly, heating the rim sufficiently to make the cement yield to the tire, and, lastly, revolving the wheel, with its tire exposed to radial pressure, while the cement is cooling, substantially as set forth.

2. The hereinabove-described process of applying cement to a concave wheel-rim, which consists in revolving the wheel with the concave surface of its rim in contact with a secondary wheel correspondingly convex, which runs in a trough of cement, substantially as set forth.

3. The hereinabove-described process of equalizing and molding cement upon the wheel-tire, which consists in revolving the wheel, with its tire covered with plastic cement, in contact with a secondary wheel which runs in a trough of water, substantially as set forth.

4. The hereinabove-described process of equalizing the stretch of rubber tires on their wheels, which consists in revolving the wheel, after the tire is thereon, with the tire exposed to radial pressure, while the cement is plastic and cooling.

5. The hereinabove-described process of equalizing the stretch of rubber tires on their wheels, which consists in revolving the wheel, after the tire is thereon, with the tire exposed to rolling pressure radially applied, as by a wheel revolved by the contact of the tire therewith, substantially as set forth.

In testimony whereof I have hereunto set my hand, in the presence of two witnesses, at Chicago, Illinois, this 30th day of September, A. D. 1886.

THOS. B. JEFFERY.

Witnesses:
G. G. JACKSON,
CHAS. S. BURTON.